US008862692B2

(12) United States Patent
Tiedemann et al.

(10) Patent No.: US 8,862,692 B2
(45) Date of Patent: Oct. 14, 2014

(54) METHOD FOR PROVIDING/ACCESSING DATA ON THE INTERNET AND A RESPECTIVE CLIENT, SERVER, AND SYSTEM

(75) Inventors: Stephen Tiedemann, Stuttgart (DE); Frank Dawidowsky, Stuttgart (DE); Klaus Roehrle, Ostfildern (DE); Meik Buscemi, Stuttgart (DE); Dietmar Schill, Winnenden (DE)

(73) Assignee: Sony Corporation, Tokyo (JP)

( * ) Notice: Subject to any disclaimer, the term of this patent is extended or adjusted under 35 U.S.C. 154(b) by 726 days.

(21) Appl. No.: 12/952,615

(22) Filed: Nov. 23, 2010

(65) Prior Publication Data

US 2011/0185037 A1 Jul. 28, 2011

(30) Foreign Application Priority Data

Nov. 24, 2009 (EP) ..................................... 09014645

(51) Int. Cl.
*G06F 15/16* (2006.01)
*H04L 29/06* (2006.01)
*G06F 21/64* (2013.01)

(52) U.S. Cl.
CPC .......... *G60F 17/30887* (2013.01); *G06F 21/64* (2013.01)
USPC .......................................... 709/217; 713/162

(58) Field of Classification Search
USPC ............................................. 709/217; 713/16
See application file for complete search history.

(56) References Cited

U.S. PATENT DOCUMENTS

| 7,127,608 B2* | 10/2006 | Royer et al. .................. 713/162 |
| 2002/0129239 A1* | 9/2002 | Clark ............................ 713/153 |
| 2002/0138347 A1 | 9/2002 | Sakata |
| 2004/0216150 A1 | 10/2004 | Scheifler et al. |
| 2005/0222953 A1* | 10/2005 | Ganesan et al. ................ 705/40 |
| 2006/0106802 A1 | 5/2006 | Giblin et al. |
| 2006/0287976 A1 | 12/2006 | Sakata |

(Continued)

FOREIGN PATENT DOCUMENTS

| EP | 1 191 448 A1 | 3/2002 |
| WO | WO 2008/063407 A2 | 5/2008 |

OTHER PUBLICATIONS

Lay-Ki Soon et al., "Identifying Equivalent URLs using URL Signatures", IEEE Conference on Signal Image Technology and Internet Based Systems, 2008, 8 pages.

(Continued)

*Primary Examiner* — Ebrahim Golabbakhsh
(74) *Attorney, Agent, or Firm* — Oblon, Spivak, McClelland, Maier & Neustadt, L.L.P.

(57) ABSTRACT

A method for providing data on the Internet, comprising calculating, using a microprocessor, a value of a predetermined function for said data, wherein the value depends on the data, determining, using said microprocessor, a uniform resource identifier including said value, and storing, at a resource on the Internet, said data, wherein the resource is accessible by using the uniform resource identifier. Further, a method for accessing data on the Internet is provided, comprising retrieving said data from a resource in the Internet by using a uniform resource identifier, determining, using a microprocessor, a part of the uniform resource identifier, the part corresponding to a value of a predetermined function, calculating, using the microprocessor, a further value for said data based on said predetermined function, wherein the value depends on the data, and determining, using the microprocessor, the integrity of said data by comparing said value and said further value.

15 Claims, 6 Drawing Sheets

(56) References Cited

U.S. PATENT DOCUMENTS

2008/0252424 A1\* 10/2008 Maltseff et al. .............. 340/10.1
2009/0287706 A1\* 11/2009 Bourges-Waldegg et al. .... 707/9
2011/0025473 A1\* 2/2011 Rokhsaz et al. ............. 340/10.4
2012/0166803 A1\* 6/2012 Hu et al. ....................... 713/171

OTHER PUBLICATIONS

Extended European Search Report issued Aug. 5, 2011, in Patent Application No. 10014412.0.

\* cited by examiner

Fig. 2

METHOD FOR PROVIDING/ACCESSING DATA ON THE INTERNET AND A RESPECTIVE CLIENT, SERVER, AND SYSTEM

An embodiment of the invention relates to a method for providing data on the Internet. A further embodiment of the invention relates to a method for accessing data on the Internet. A further embodiment of the invention relates to a server configured to provide data on the Internet. Another embodiment of the invention relates to a client configured to access data on the Internet. A further embodiment of the invention relates to a system for providing and accessing data on the Internet.

BACKGROUND

There exist various applications where it is necessary to check the integrity of data provided and/or downloaded from the Internet.

BRIEF SUMMARY

It is an object of the invention to provide a method, system and devices for efficiently checking the integrity of data provided and/or downloaded from the Internet.

This object is solved by methods and/or devices according to the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
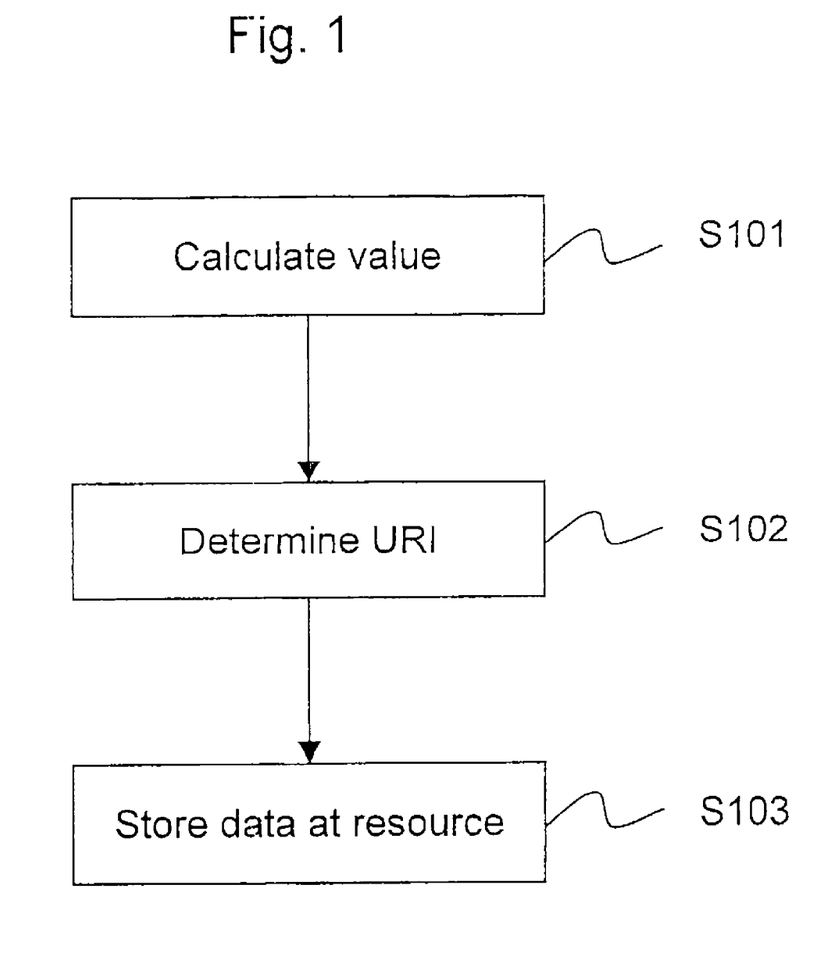
FIG. 1 shows a schematic flowchart of an embodiment of the invention.

FIG. 1 shows a flowchart of a method for providing data on the Internet. In this embodiment, the data is stored at a resource on the Internet. This resource may be a server or a distributed database provided on a plurality of servers and computing nodes in a network. Further, in this embodiment, the data stored at the resource may be electronic contact data, e.g. name, address etc. of a contact person, i.e. data as conventionally provided on business cards. However, the data used in this embodiment is not limited to these types of data. Any type of data where a recipient may wish to perform an integrity check is conceivable.

For storing such data, at S101, a value of a predetermined function for the data to be provided on the Internet is calculated by using a microprocessor. The calculated value depends on the underlying data. The microprocessor used may be of hardware type. Various types of specialized hardware processors and co-processors are conceivable.

The predetermined function employed at S101 may be a cryptographic hash function, such as e.g. secure hash algorithm (SHA) functions. The Message-digest algorithm 5 (md5) is an example of these secure hash algorithm functions. These functions calculate a numeric value based on the content of the data. This value can then be used to check the integrity of the data that has been subjected to the function. The integrity check of the data is further discussed in relation to FIGS. 2 and 3.

At S102, a uniform resource identifier (URI) is determined by using the afore-mentioned microprocessor. The uniform resource identifier may be a string of characters that is used to identify and access resources in a network like the Internet. The uniform resource identifier, e.g. the string of characters, may be divided into several parts. Each part may be used for different operations. The uniform resource identifier may have a specialized part including or consisting of the value calculated at S101. Others parts of the uniform resource identifier may be used for accessing a server on the Internet or another computer network. A further discussion on the parts of the uniform resource identifier is given in relation to FIG. 4.

At S103, the data is stored at a resource on the Internet, wherein the resource is accessible by using the uniform resource identifier determined at S102. The resource on the Internet may be a server or a distributed file system spread across a plurality of computers, workstations and/or servers.

Figure 2:
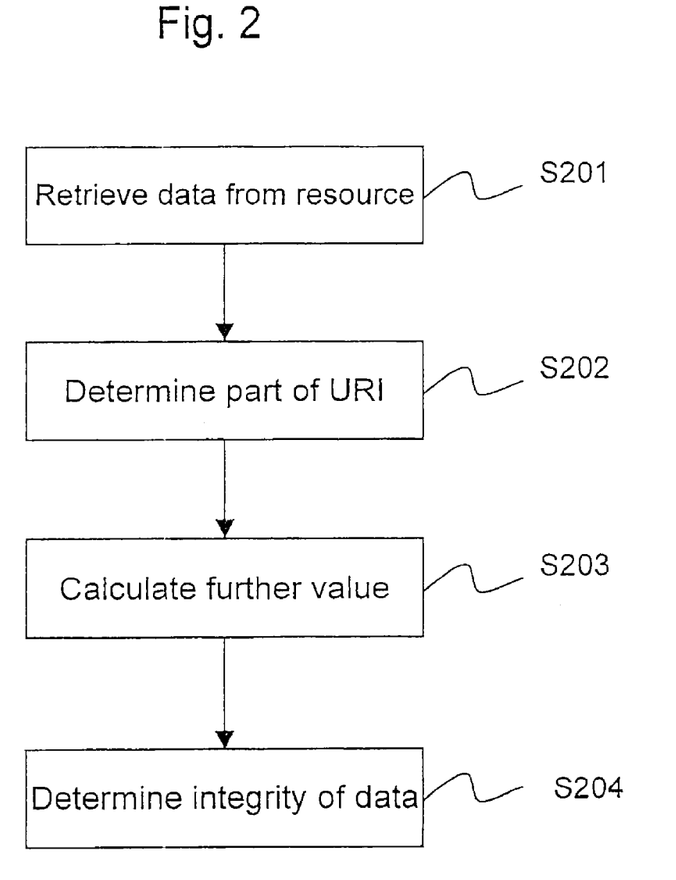
FIG. 2 shows a schematic flowchart of a further embodiment of the invention.

FIG. 2 shows another flowchart of an embodiment of a method for accessing data on the Internet. Thereby, the data may be stored at a resource on the Internet. At S201, data is retrieved from the resource on the Internet by using a uniform resource identifier. The uniform resource identifier may be provided through an out-of-band channel. An out-of-band channel refers to separate ways of providing data: on the one hand, data may be provided through a main connection, e.g. via a network, and on the other hand, additional required data may be provided using a different channel (out-of-band channel), e.g. via a data carrier. An out-of-band channel may be some sort of physical storage medium like e.g. a business card enhanced with electronic storage, a CD-ROM, a USB memory stick or the like. This storage may, in the case of the business card, extend the information printed on the business card. The uniform resource identifier may include a value of a predetermined function. Again, this predetermined function may be a cryptographic hash function. The operation of S201 may be initiated by a client (a workstation PC, a laptop or any other computing device). The retrieved data may then be stored in a storage of this client.

At S202, by using a microprocessor, a part of the uniform resource identifier may be determined that corresponds to a value of a predetermined function, wherein the predetermined function may be, as already discussed, a cryptographic hash function. The part determined at S202 may therefore be e.g. a value of a cryptographic hash function.

At S203, based on the retrieved data a further value is calculated by using the same predetermined function. These two values, i.e. the further value that has been calculated on the client and the value obtained/extracted from the uniform resource identifier are then compared at S204 in order to determine the integrity of the data that has been retrieved from the resource on the Internet at S201. Even slight changes in the content of the data cause a different numeric value when employing a secure hash algorithm function. By comparing a previously known value (included in the uniform resource identifier) for the data and a newly calculated one (further value), it is possible to check the data's integrity. If the two values are not equal, the integrity check fails.

Figure 3:
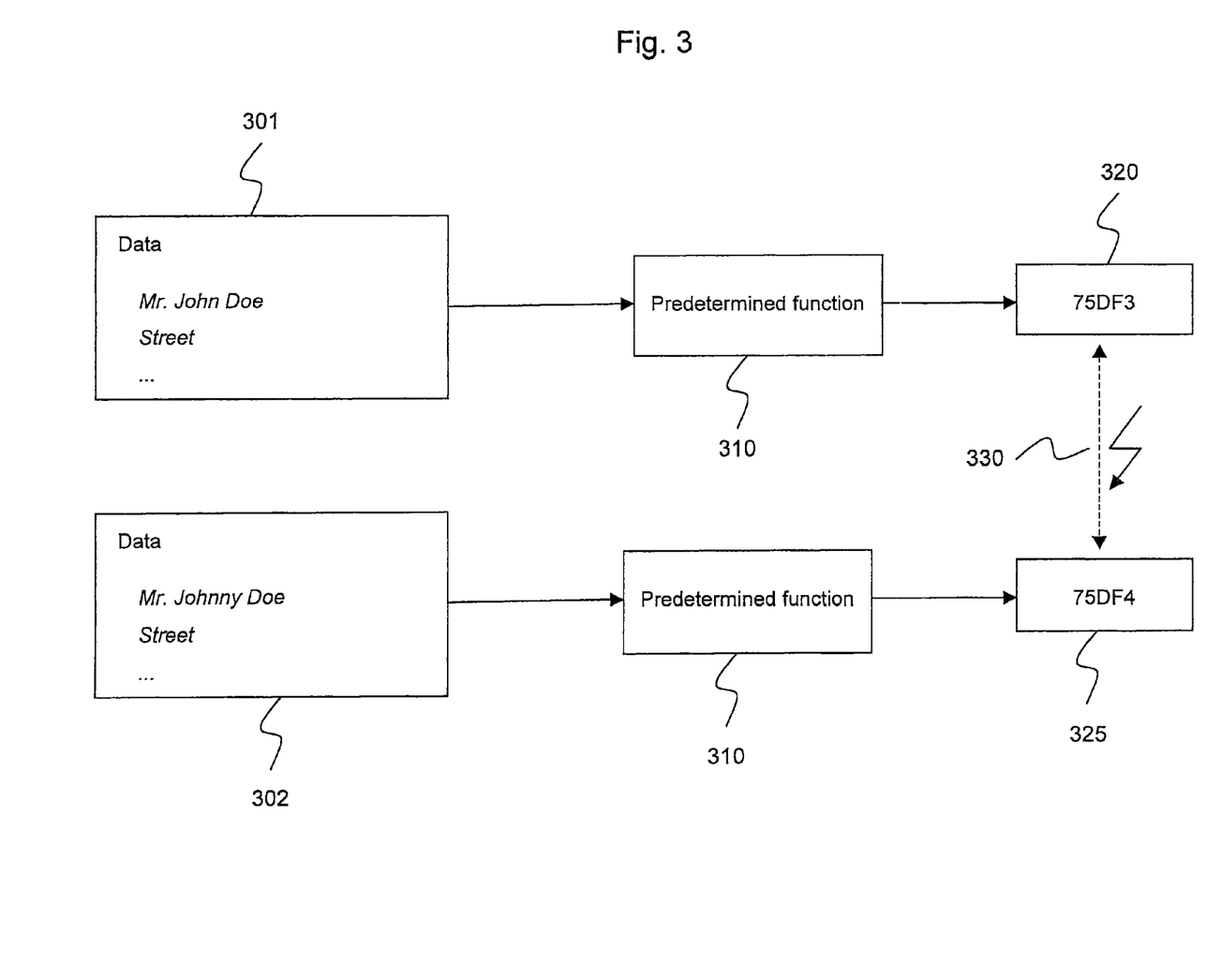
FIG. 3 shows an embodiment of an application of a predetermined function.

The integrity check is illustrated in FIG. 3. Two data sets, a first data set 301 and a second data set 302 are shown. Both of them include contact information, describing a contact's name and address. However, while in the first data set 301, the contact's name is "Mr. John Doe", it slightly differs in the second data set 302 ("Mr. Johnny Doe"). The first data set 301 as well as the second data set 302 are subjected to the same predetermined function 310. This may be a cryptographic hash function such as e.g. the Message-digest algorithm 5 (md5). The results of the application of this predetermined function are a first hash value 320 ("75DF3") and a second hash value 325 ("75DF4"). In order to check the data integrity, i.e. in order to check whether both sets of data are the same, the two values 320 and 325 are compared. As can be seen, in the example of FIG. 3, the values differ (as indicated by arrow 330) and, hence, it is assumed that the data also differs (no integrity of data). If the first data set 301 and the second data set 302 were supposed to be the same data, the integrity check fails.

The upper part of FIG. 3, as designated by the reference signs 301, 310 and 320, describes a part of the process taking place at the server side (cf. also FIG. 1). Data to be provided on the Internet may be represented by the first data set 301. A value is calculated by employing a predetermined function 310 (cf. S101 in FIG. 1). The calculated value, the first hash value 320, may be the value used at S102 in order to determine the uniform resource identifier. Thereafter, the first data set 320 may be stored on the server, which may be the resource on the Internet. This may resemble be the operation discussed in relation to S103.

The lower part of FIG. 3, as designated by the reference signs 302, 310 and 320, describes a part of the process at the client side (cf. also FIG. 2). Herein, the first data set 301 stored at the server, being a resource on the Internet, is retrieved or downloaded by the client (cf. S201). The downloaded first data set 301 may therefore represent the original data stored on the server. It may be conceivable that the data has been modified in some way, either due to communication errors, by chance, by the involvement of a hacker or the like. In this respect, the modified data may be represented by the second data set 302. The further value calculated in S203 might be the second hash value 325 obtained by applying the predetermined function 310 to the data downloaded and having been modified in some way (the second data set 302). It now becomes obvious to the client that the downloaded data set 302 (second data set) differs from the original data set 301 (first data set) stored on the server by comparing the two hash values 320 and 325.

Figure 4:
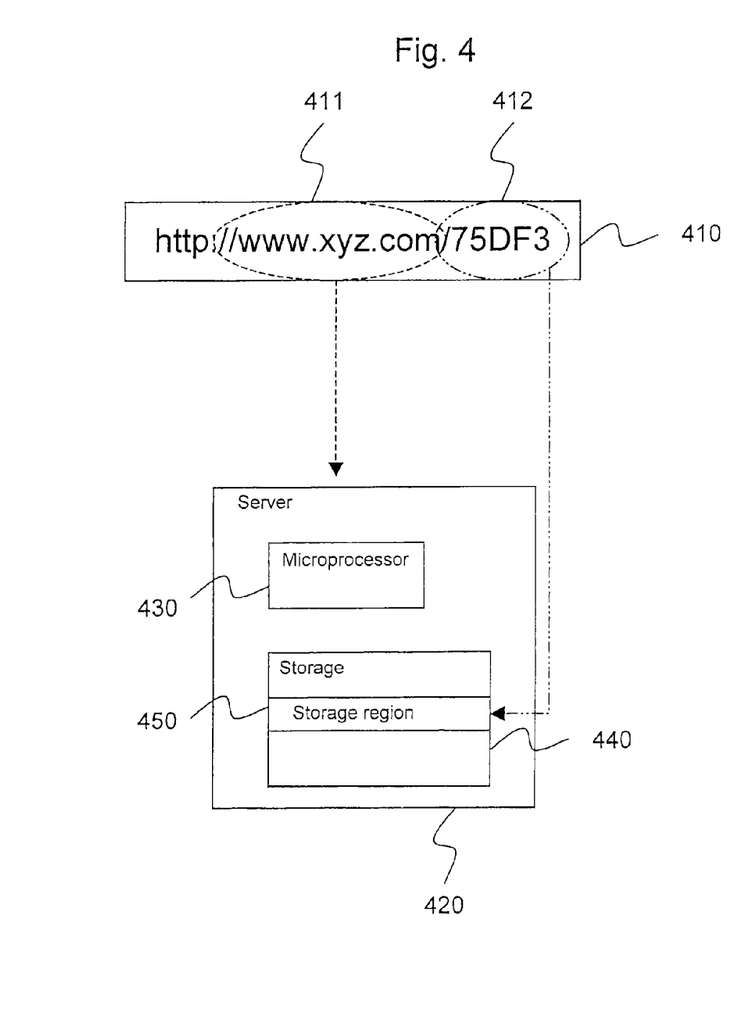
FIG. 4 shows an embodiment of a URI and its relation to of a server.

FIG. 4 shows an embodiment of a uniform resource identifier 410 and its relation to an embodiment of a server 420 which is an example for a resource. The server 420 may comprise a microprocessor 430, a storage 440 and storage region 450 which may be a dedicated space within the storage 440. The uniform resource identifier 410 may include a string of characters and may be split into a plurality of parts. Each part may be a substring of the string of characters. In the embodiment illustrated by FIG. 4 the uniform resource identifier 410 is split into a first part 411 and a second part 412. It is not necessary that the parts be contiguous.

The uniform resource identifier 410 may be used to access the server 420 on the Internet where the data may be stored in the storage region 450 of the storage 440. The first part 411 of the uniform resource identifier 410 may be used to access, identify and name the server 420. The second part 412 of the uniform resource identifier 410 may represent the value calculated by the predetermined function for the data stored at the server 420 (see FIG. 1 and the thereto related discussion). The second part 412 may, therefore, be used to access the data stored in the corresponding storage region 450, i.e. the storage 440 may be arranged such that an access to a particular region depends on the second part 412. The microprocessor 430 of the server 420 may be used to carry out the access and retrieval operation in accordance with the uniform resource identifier 410.

Although in the present embodiment the first part 411 is immediately followed by the second part 412, there is no need for the parts of being consecutively arranged (contiguous). Other arrangements of the first and the additional plurality of parts within the uniform resource identifier 410 may be possible.

Figure 5:
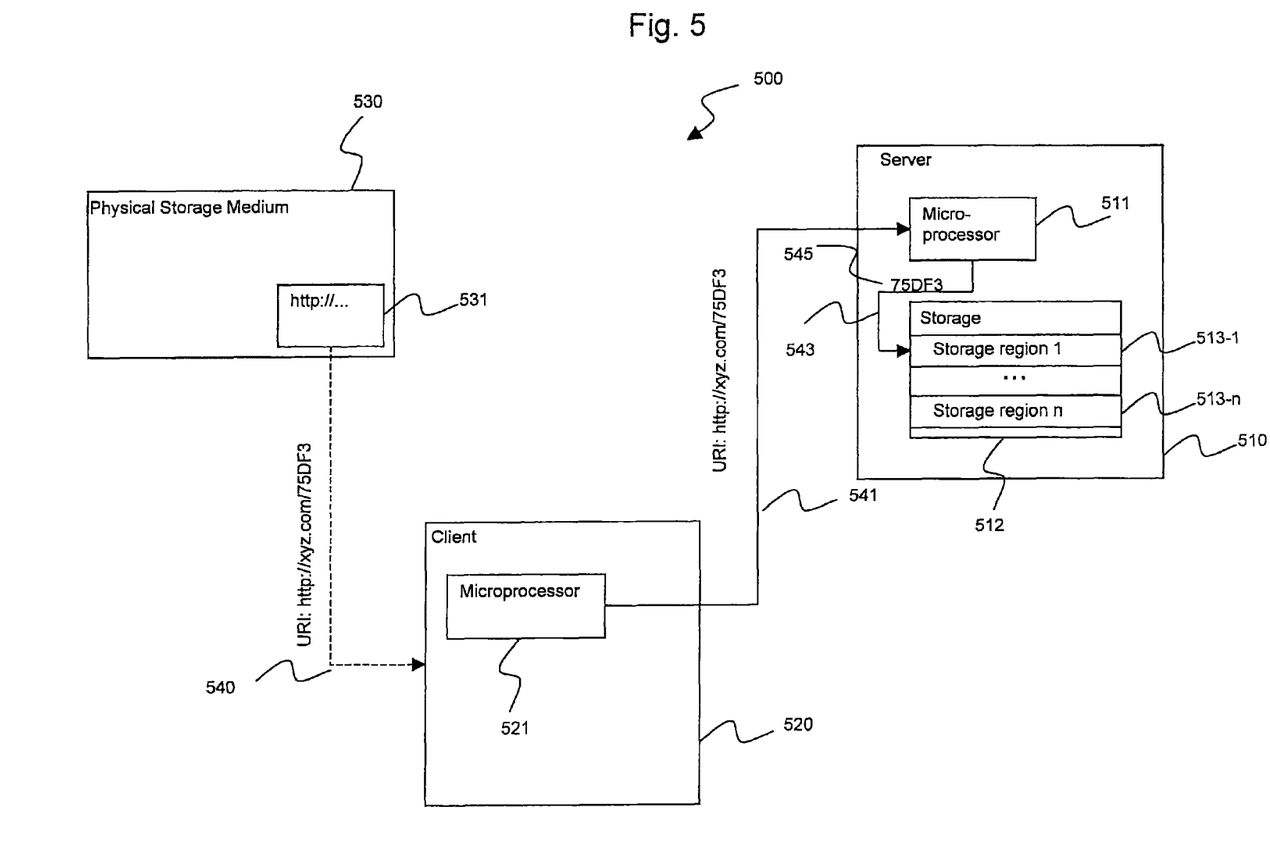
FIG. 5 shows an embodiment of a system, and FIG. 6. shows an embodiment of a physical storage medium.

FIG. 5 shows an embodiment of a system 500. The system 500 shown in FIG. 5 comprises a server 510, a client 520, and a physical storage medium 530. The server 510 comprises a microprocessor 511 which is used to carry out computations. The microprocessor 511 used may be of hardware type. Various types of specialized processors and co-processors are conceivable. The server 510 further comprises a storage 512 where data may be stored. The storage 512 may be divided into storage regions 513-1 to 513-N. Each storage region 513-1 to 513-N may be capable of storing a data item (data entity). A storage region 513-1 to 513-N does not have to be limited to store only one data item.

The client 520 comprises a microprocessor 521 which is adapted to carry out and execute instructions on the client. The client 520 may further comprise a graphical user interface (GUI; not shown). The graphical user interface may be used to provide information for the user regarding the data integrity of data downloaded from the server 510. An advantage of the use of a graphical user interface may be that the user is visually informed whether an integrity check fails or not. This may lead to a higher ease of use.

The physical storage medium 530 may be a business card with an included uniform resource identifier 531. The uniform resource identifier 531 may be stored on or transmitted by a kind of Radio Frequency Identification (RFID) tag or Near Field Communication (NFC) tag. Also, instead of a business card, optical and other storage media, without the RFID or NFC tag, like CDs, DVDs, USB memory sticks, hard disks, or the like are conceivable, on which the uniform resource identifier 531 may be stored. The uniform resource identifier 531 may be used to access data on the server 510. As discussed above, the uniform resource identifier 531 may include a value of a predetermined function, wherein the value of depends on the data stored at the server 510 which is supposed to be accessed by the client 520.

In this embodiment, the uniform resource identifier 531 stored in the physical storage medium 530 is transferred to the client 520 via a wireless connection 540. For this, Radio Frequency Identification technologies may be used. However, disk drives, USB slots and any other interface configured to attach media to a client are conceivable.

Radio Frequency Identification (RFID) is the usage of a so-called RFID tag applied to or incorporated into an object. It is used for identifying and tracking this object by employing radio waves. The radio signals emitted by these tags are often limited in range which can vary from a few meters or even centimeters to several hundred meters. Most RFID tags comprise at least two parts. The first one is an integrated circuit for storing and processing information and modulating and demodulating a radio frequency signal. The second part is an antenna for receiving and transmitting the signal.

RFID's potential of miniaturization (e.g. a chip size of 0.05 mm×0.05 mm is possible at the moment) opens a vast amount of new application areas, also boosted by the decreasing price for this technology.

Therefore, it is one advantage that a physical storage medium 530 with transmitting capabilities may be used in an easy and cheap way. In this way, it becomes feasible to enhance and extend "give-away" material like business cards with electronic information offering thereby electronic storage. This electronic storage may be used to store up-to-date contact information, multimedia information like videos or images. In addition, the electronic storage may include supplementary material to the information printed on the card like the contact person's complete resume. Even whole software programs like computer games and other applications may be linked with the information provided on the physical storage medium 530 itself. Another advantage is that the information need not be stored in the physical storage medium 530 itself, but may be located at a resource on Internet, like the server 510. Therefore, only small and limited information, like the uniform resource identifier 531, needs to be stored. Thereby, costs may be further reduced since only a small and, therefore, cheap storage may be used.

The client 520 is able to handle the uniform resource identifier received via the wireless connection 540. If a user wants to access the data designated by the received uniform resource identifier, the microprocessor 521 will execute an access operation for accessing the data stored on the designated server 510. The uniform resource identifier may therefore be used to access the server 510 via a network connection 541. This connection may be wired or wireless or any other conceivable connection, e.g. a connection via the Internet. The microprocessor 511 determines the value 545 (based on the uniform resource identifier) that was calculated by a predetermined function based on the data being subjected to access. This value 545 is used to access (as indicated by reference sign 543) the data stored in the storage region 513-1 of the storage 512. The data stored there is then provided to the client 520 requesting the access. The client 520 or alternatively or additionally the server 510 may then carry out an integrity check as discussed above.

The embodiment as shown by FIG. 5 is not limited to the use of business cards. In addition, it may be conceivable that the server 510 is a public key server storing public keys, as used in asymmetric cryptography, e.g. in at least a part of the storage regions 513-1 to 513-n of the storage 512. In the case of public keys the value 545 may correspond to a fingerprint (value of predetermined function) of the public key which is supposed to be retrieved from the server 510. This fingerprint may be calculated using the same or any other predetermined function as in the embodiment shown in FIG. 5.

An advantage is that the client 520 can be sure that the data it received from the server 510 corresponds to the data designated by the uniform resource identifier 531 stored on the physical storage medium 530, i.e. the data is valid and integer. Another advantage is that the integrity check may be carried out automatically without the need of the user to interact or manually check the values. Another advantage is that "man-in the middle attacks" become hardly possible since the uniform resource identifier 531 provided on the physical storage medium 530 is available via an out-of-band channel and altering the information is easily detectable through the integrity check.

A still further advantage is that only the data needs to be stored on the server 510. This is different in systems where the uniform resource identifier does not include a value as explained above. Such systems would need to store the data and additional information like the hash values which both would have to be retrieved in order to carry out an integrity check. Thus, by including the value in the uniform resource identifier 531, storage in the server 510 can be saved as well as bandwidth when doing an integrity check.

Figure 6:
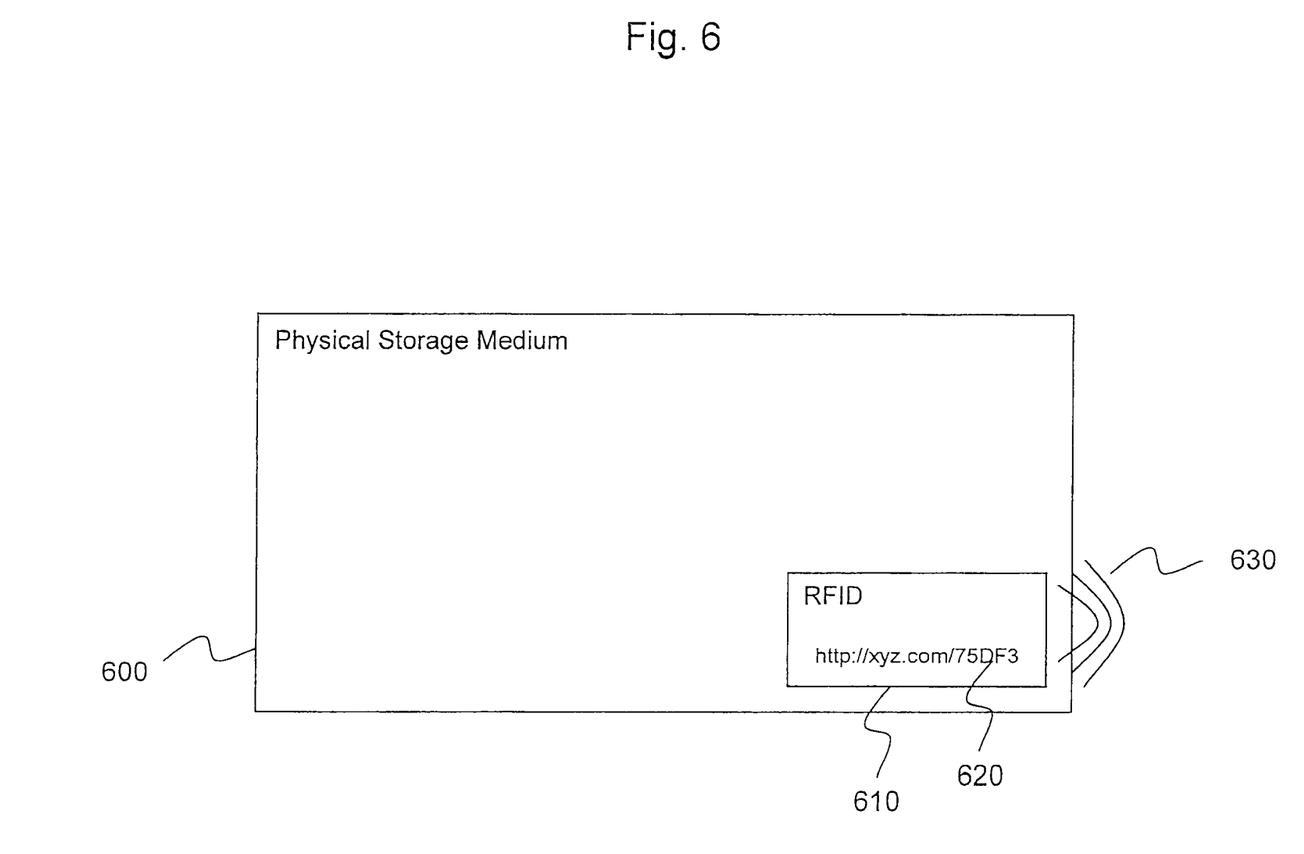

FIG. 6 shows an embodiment of a physical storage medium 600 with an attached Radio Frequency Identification (RFID) tag 610. This combination of the RFID tag 610 and the physical storage medium 600 may be used to store and transmit a uniform resource identifier 620. In this embodiment the RFID tag 620 is a passive chip not having a battery. However, active chips may also be conceivable. The uniform resource identifier 620 stored on the tag 610 is propagated via radio waves 630 when a RFID reader (not shown) is close by. In this way, the uniform resource identifier 610 may be transmitted to a client (not shown) being capable of reading RFID information. The physical storage medium 600 may be a paper-based business card or a plastic card with an included electronic storage, like the RFID tag 610 shown in FIG. 6. However, it is not limited to these types. Other media, without a transmitting unit like the RFID tag 610, like a CD-ROM, a DVD or a USB memory stick may be conceivable wherein the uniform resource identifier 620 is stored on these media. In addition, the RFID tag 610 may be replaced by Near Field Communication (NFC) tags or the like since RFID has some limitations regarding storage capacity.

An attempt to overcome these limitations was introduced by the technology of Near Field Communication (NFC) which also is a short-range high frequency wireless communication technology enabling the exchange of data between devices. The storage area (memory) is larger than the one of RFID tags and ranges up to 32 Kbytes.

NFC is built on top of the ISO/IEC 14443 proximity-card standard which also comprises RFID. Therefore, an NFC device is capable of communicating with existing ISO/IEC 14443 smartcards and readers and is thereby compatible with already existing contact-less infrastructures being available (e.g. being used for payment in public transportation or the like).

Other than in the embodiment shown in FIG. 6, the physical storage medium 600 may not be limited to a business card. Furthermore, a paperback or hardcover book or a CD/DVD/Bluray cover may be conceivable with the RFID tag 610 attached to it. The tag 610 may store the uniform resource identifier 620. The uniform resource identifier 620 may then be used to download an electronic copy of the book or other data in an arbitrary format or additional material going beyond the content of the printed version of the book from a server of the vendor or any other source.

A further embodiment relates to an application in the field of public key authentication. When a public key is received over an untrusted (unsecure) channel, such as the Internet, the recipient often wishes to authenticate the public key. For public key authentication, fingerprints (a hash of the key data, i.e. the value of a predetermined function) are often used since their small size allows them to be passed over trusted channels where public keys won't easily fit. For example, if Alice wishes to authenticate a public key as belonging to Bob, she can contact Bob over the phone and ask him to read his fingerprint (value of predetermined function) to her. Alice can then check that this trusted fingerprint matches the fingerprint of the public key which she may determine on her computer for data which she has downloaded from the internet.

A fingerprint of a person's public key may be stored on a small NFC Tag as part of the URL pointing to the person's public key storage location. If the NFC Tag itself is distributed in a trusted manner, for example exchanged person to person or by trusted mail service, both download and verification of the public key can be accomplished by a user agent software without the user to manually compare hexadecimal numbers.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for providing data to a server on the Internet by a uniform resource identifier that is a second string of characters to identify and access the data on the Internet, a part of the second string of characters being a first string of characters, comprising:
calculating, using a microprocessor, a calculated value from said data provided on the Internet using a predetermined function, wherein the calculated value depends on the data and the calculated value is the first string of characters;
determining, using said microprocessor, the uniform resource identifier; and
storing, at a resource on the Internet, said data, wherein the resource is accessible by using the uniform resource identifier,
wherein the first string of characters being used to access said data stored in a corresponding storage region of a storage in the server, and a remaining part of the second string of characters identifies the server on the Internet, and
wherein when said data is retrieved by a client by using the uniform resource identifier, the client calculates a further value from the data retrieved by the client from the Internet using the predetermined function and compares the further value with said calculated value for verifying the integrity of said data retrieved by the client from the Internet.

2. The method according to 1, comprising: distributing the uniform resource identifier to a user on a physical storage medium.

3. The method according to 2, wherein the physical storage medium uses a Radio Frequency Identification (RFID) chip and/or a Near Field Communication (NFC) chip for storing the uniform resource identifier.

4. The method according to 3, wherein the predetermined function is a cryptographic hash function.

5. A client configured to access data on the Internet by a uniform resource identifier that is a second string of characters to identify and access the data on the Internet, a part of the second string of characters being a first string of characters, comprising:
a microprocessor adapted to retrieve said data from a server on the Internet by using the uniform resource identifier,
to determine the part of the second string of characters, the part corresponding to a calculated value calculated from said data using a predetermined function and the value is the first string of characters included in the second string of characters, the first string of characters being used to access said data stored in a corresponding storage region of a storage in the server, wherein the value depends on the data, and a remaining part of the second string of characters identifies the server on the Internet,
to calculate a further value from the data retrieved by the client from the Internet using said predetermined function, and
to determine the integrity of the data retrieved by the client from the Internet by comparing said calculated value and said further value.

6. The client according to 5, wherein the client is configured to read the uniform resource identifier from a physical storage medium.

7. The client according to 6, wherein the physical storage medium is a Radio Frequency Identification (RFID) chip and/or a Near Field Communication (NFC) chip for storing the uniform resource identifier.

8. The client according to 7, wherein the predetermined function is a cryptographic hash function.

9. A non-transitory computer readable storage medium, having computer readable instructions stored therein that when executed by a microprocessor cause the microprocessor to perform a method for providing data to a server on the Internet by a uniform resource identifier that is a second string of characters to identify and access the data on the Internet, a part of the second string of characters being a first string of characters, the method comprising:
calculating, using the microprocessor, a calculated value from said data provided on the Internet using a predetermined function, wherein the calculated value depends on the data and the calculated value is the first string of characters;
determining, using the microprocessor, the uniform resource identifier; and
storing, at a resource on the Internet, said data, wherein the resource is accessible by using the uniform resource identifier,
wherein the first string of characters being used to access said data stored in a corresponding storage region of a storage in the server, and a remaining part of the second string of characters identifies the server on the Internet, and
wherein when said data is retrieved by a client by using the uniform resource identifier, the client calculates a further value from the data retrieved by the client from the Internet using the predetermined function and compares the further value with said calculated value for verifying the integrity of said data retrieved by the client from the Internet.

10. The non-transitory computer readable storage medium according to 9, wherein the predetermined function is a cryptographic hash function.

11. The non-transitory computer readable storage medium according to 9, wherein the method comprising distributing the uniform resource identifier to a user on a physical storage medium, and wherein the physical storage medium is a Radio Frequency Identification (RFID) chip and/or a Near Field Communication (NFC) chip storing the uniform resource identifier.

12. The non-transitory computer readable storage medium according to 9, wherein the method comprising distributing the uniform resource identifier to a user on a physical storage medium, and wherein the physical storage medium being a business card.

13. A system for providing and accessing data on the Internet by a uniform resource identifier that is a second string of characters to identify and access the data on the Internet, a part of the second string of characters being a first string of characters, comprising:

a server configured to provide data on the Internet, including, a storage adapted to store the data in storage regions, and
a microprocessor adapted to calculate a calculated value from said data provided on the Internet using a predetermined function, wherein the calculated value depends on the data and the calculated value is the first string of characters, to determine the uniform resource identifier, and to store said data in a storage region in the storage, wherein the storage region is accessible by using the uniform resource identifier;

a physical storage medium configured to store the uniform resource identifier for identifying the data on the server;

a client configured to read the uniform resource identifier from the physical storage medium, including, a microprocessor adapted to retrieve said data from the server by using the read uniform resource identifier, to determine the first string of characters included in the second string of characters, the first string of characters being used to access said data stored in a corresponding storage region of the storage in the server, and a remaining part of the second string of characters identifies the server on the Internet, to calculate a further value from the data retrieved by the client from the Internet using said predetermined function, and to determine the integrity of the data retrieved by the client from the Internet by comparing said calculated value and said further value.

14. The system according to 13, wherein the physical storage medium is a Radio Frequency Identification (RFID) chip and/or a Near Field Communication (NFC) chip for storing the uniform resource identifier.

15. The system according to 14, wherein the predetermined function is a cryptographic hash function.

* * * * *